United States Patent
Sohn (10) Patent No.: US 10,485,055 B2
(45) Date of Patent: Nov. 19, 2019

(54) LIGHTING APPARATUS INCLUDING FUNCTION CONFIGURATION SWITCH MODULE AND CONTROL METHOD THEREFOR, AND COMPUTER-READABLE RECORDING MEDIUM HAVING PROGRAM RECORDED THEREON FOR EXECUTING SAME

(71) Applicant: SAMJIN LND Co., Ltd, Hwaseong-si, Gyeonggi-Do (KR)

(72) Inventor: Choong-Yong Sohn, Cheongju-si (KR)

(73) Assignee: SAMJIN LND CO., LTD, Hwaseong-si, Gyeonggi-Do (KR)

( * ) Notice: Subject to any disclaimer, the term of this patent is extended or adjusted under 35 U.S.C. 154(b) by 0 days.

(21) Appl. No.: 15/754,217

(22) PCT Filed: Mar. 16, 2016

(86) PCT No.: PCT/KR2016/002603
§ 371 (c)(1),
(2) Date: Feb. 21, 2018

(87) PCT Pub. No.: WO2017/155145
PCT Pub. Date: Sep. 14, 2017

(65) Prior Publication Data
US 2018/0249533 A1 Aug. 30, 2018

(30) Foreign Application Priority Data
Mar. 16, 2016 (KR) ........................ 10-2016-0028709

(51) Int. Cl.
*H05B 37/02* (2006.01)
*H05B 33/08* (2006.01)
*H04W 84/18* (2009.01)

(52) U.S. Cl.
CPC ............ *H04W 84/18* (2013.01); *H05B 33/08* (2013.01); *H05B 37/02* (2013.01);
(Continued)

(58) Field of Classification Search
CPC ................ H05B 33/08; H05B 33/0815; H05B 33/0842; H05B 33/0851; H05B 33/0809;
(Continued)

(56) References Cited

U.S. PATENT DOCUMENTS

| 8,013,545 B2 * | 9/2011 | Jonsson | ................... F21V 23/04 |
| | | | 315/297 |
| 8,742,694 B2 * | 6/2014 | Bora | ................... H05B 33/0863 |
| | | | 315/307 |

(Continued)

FOREIGN PATENT DOCUMENTS

| JP | 2012-004062 A | 1/2012 |
| KR | 10-2005-0079890 A | 8/2005 |

(Continued)

OTHER PUBLICATIONS

International Search Report for International Application No. PCT/KR2016/002603 (4 pages) (dated Dec. 12, 2016).

*Primary Examiner* — Tung X Le
*Assistant Examiner* — Boma Alaeddin
(74) *Attorney, Agent, or Firm* — Lucas & Mercanti, LLP (57) ABSTRACT

The present invention provides a lighting apparatus including a function configuration switch module and a control method therefor. The lighting apparatus may include: a lighting module; a lighting driving module for driving the lighting module; a communication module for performing data communication; a storage module for storing a program for controlling the lighting module, data generated by the program, and unique identification information of a lighting apparatus; a function configuration switch module for out- (Continued)

putting a switching function selection signal to perform a bridge setting or releasing function; and a control module controlling the lighting driving module, and the communication module to transmit a signal for configuration or release of a bridge together with the unique identification information of the lighting apparatus. Therefore, a bridge access delay time can be minimized and an access success rate can be maximized, and thus, wireless mesh network-based lighting apparatuses can be efficiently controlled.

24 Claims, 3 Drawing Sheets

(52) U.S. Cl.
CPC ........ *H05B 37/0272* (2013.01); *Y02B 20/346* (2013.01); *Y02B 20/348* (2013.01); *Y02B 20/42* (2013.01)

(58) Field of Classification Search
CPC ............ H05B 33/0827; H05B 33/0845; H05B 33/0848; H05B 33/0854; H05B 33/0863; H05B 33/0866; H05B 37/0272; H05B 37/02; H05B 37/0245; H05B 37/0227; H05B 37/0254; H05B 37/029; H05B 37/0218; H05B 37/0281
See application file for complete search history.

(56) References Cited

U.S. PATENT DOCUMENTS

| | | | |
|---|---|---|---|
| 9,204,291 B2 * | 12/2015 | Jackson | H04W 8/245 |
| 2011/0095687 A1 | 4/2011 | Jonsson | |
| 2012/0068611 A1 * | 3/2012 | Steiner | H05B 37/0227 315/155 |
| 2015/0168931 A1 * | 6/2015 | Jin | H04L 12/12 700/90 |
| 2018/0129493 A1 * | 5/2018 | Deixler | H04L 12/2814 |

FOREIGN PATENT DOCUMENTS

| | | | |
|---|---|---|---|
| KR | 10-0513144 B1 | | 9/2005 |
| KR | 10-2009-0007964 A | | 1/2009 |
| KR | 10-0956790 B1 | | 5/2010 |
| KR | 100956790 B1 | * | 5/2010 |
| KR | 10-1270343 B1 | | 5/2013 |
| KR | 10-1270434 B1 | | 5/2013 |
| KR | 10-2014-0006944 A | | 1/2014 |
| KR | 10-2014-0103573 A | | 8/2014 |
| KR | 10-2015-0050158 A | | 5/2015 |

* cited by examiner

LIGHTING APPARATUS INCLUDING FUNCTION CONFIGURATION SWITCH MODULE AND CONTROL METHOD THEREFOR, AND COMPUTER-READABLE RECORDING MEDIUM HAVING PROGRAM RECORDED THEREON FOR EXECUTING SAME

CROSS-REFERENCE TO RELATED APPLICATIONS

This application is a U.S. national stage of PCT/KR2016/002603, filed Mar. 16, 2016 which claims the benefit of priority from Korean Patent Application No. 10-2016-0028709, filed Mar. 10, 2016, the contents of each of which are incorporated herein by reference.

TECHNICAL FIELD

The present invention relates to a lighting apparatus including a function configuration switch module and a control method therefor, and a computer readable recording medium having a program recorded thereon for the same.

BACKGROUND ART

In general, in a lighting control system, a lighting controller (for example, a wall controller, a remote controller, a sensor, a mobile or smart device, etc.) controls a plurality of lighting devices.

Herein, the lighting controller wirelessly controls a plurality of lighting devices through an independent wireless mesh network (WMN). For this, each lighting device is connected to the wireless mesh network of the lighting controller.

Herein, the lighting controller implements the wireless mesh network by using at least one wireless channel having a good channel state among accessible wireless channels. Accordingly, in order to connect to the wireless mesh network, each lighting device determines a channel having the best channel state among accessible wireless channels.

In other words, in the above lighting control system, the lighting controller selects a lighting device having the best signal state among a plurality of lighting devices connected to a wireless mesh network (WMN) as a bridge, and completes a connection with the bridge.

Then, the lighting controller communicates with the lighting device designated as the bridge, and controls the plurality of lighting devices connected to the wireless mesh network through the bridge.

However, in the above lighting control system, there are difficulties in selecting a single lighting device among a plurality of lighting devices as a bridge, and completing the connection. In other words, since an allowed frequency resource is limited, the failure rate is high the when the lighting controller confirms a connection by receiving a connection response, and a connection delay time increases due to repeated connection request. Thus, user dissatisfaction grows. As a number of lighting devices increases, a connection failure rate and delay time also increases. Accordingly, efficiency of the lighting control system is degraded.

DISCLOSURE

Technical Problem

Accordingly, the present invention has been made keeping in mind the above problems occurring in the prior art, and an object of the present invention is to provide a lighting apparatus including a function configuration switch module and a control method therefor, and a computer readable recording medium having a program recorded thereon for the same, the apparatus and the method being capable of minimizing a bridge accessing delay time and maximizing an accessing success rate, thus being capable of efficiently controlling lighting apparatuses based on a wireless mesh network (WMN) by configuring each of the lighting apparatuses with a function configuration switch module in order to easily access and control a number of lighting apparatus configured based on the wireless mesh network (WMN).

Technical Solution

In order to accomplish the above object, according to a first aspect of the present invention, there is provided a lighting apparatus including a function configuration switch module, the apparatus including: a lighting module installed in a predetermined indoor space and emitting light; a lighting driving module applying driving power to the lighting module; a communication module performing data communication with an external lighting control device or a sever; a storage module storing a program that controls an operation of the lighting module, data generated by executing the program, and unique identification information of the lighting apparatus; a function configuration switch module outputting a switching function selection signal so that a bridge setting or releasing function for configuring a wireless mesh network is performed according to a switching operation state of a function configuration switch; and a control module controlling an operation of the lighting driving module such that the driving power is applied to the lighting module according to the program stored in the storage module by being provided with a lighting control signal output from the external lighting control device or the server through the communication module, and controls such that the unique identification information of the lighting apparatus stored in the storage module, and a signal for bridge setting or releasing are transmitted through the communication module according to the switching function selection signal output from the function configuration switch module.

Herein, it is preferable for the lighting module to include at least one of a light emitting diode (LED) lamp that is a semiconductor element emitting light, a fluorescent lamp, an incandescent lamp, a halogen lamp, a neon tube lamp, a sodium lamp, a metalhalide lamp, and a electro-luminescent (EL) lamp.

Preferably, the lighting driving module may apply the driving power to the lighting module by adjusting a brightness and a wavelength of light according to a control of the control module.

Preferably, the communication module may perform data communication with the external lighting control device or the server by using a near fled communication method of at least one of Bluetooth communication, ZigBee communication, Beacon communication, radio frequency identification (RFID) communication, ultra wideband (UWB) communication, and infrared data association (IrDA) communication, or by using a wireless communication method according to a control of the control module.

Preferably, the unique identification information of the lighting apparatus stored in the storage module may include any one piece of information of an apparatus name, an apparatus password, an apparatus serial number, an apparatus type, an apparatus manufacturer, an apparatus media access control (MAC) address, an apparatus unique Internet protocol (IP) address, apparatus model and version, an apparatus secret key, and apparatus authentication information generated by a personal key based on a PKI.

Preferably, the function configuration switch module may output a switching function selection signal according to the switching operation state of the function configuration switch module so that a bridge resetting function is further performed, and the control module may control such that a signal for bridge accessing or register information data of the lighting apparatus which is transmitted from the external lighting control device or the server for configuring the wireless mesh network is provided through the communication module and stored in the storage module, and controls such that a setting initialization is performed by removing the signal for bridge accessing or the register information data of the lighting apparatus which is stored in the storage module according to the switching function selection signal having the bridge resetting function which is output from the function configuration switch module.

Preferably, the switching operation state of the function configuration switch provided in the function configuration switch module may be determined by using at least one condition of a preset number of ON/OFF times and an ON time of a switch operation.

Preferably, the function configuration switch provided in the function configuration switch module may be configured with at least one of a toggle switch, a pull switch, a slide switch, a push switch, a micro switch, a dip switch, and a rotary switch.

Preferably, the apparatus may further include a function display module visually displaying a current function state to a user according to the switching function selection signal output from the function configuration switch module, wherein the control module may control an operation of the function display module 180 so that the function display module 180 displays a state by using at least one of a color of light, a brightness of light, and a number of blinks of light which is different for each function according to the switching function selection signal output from the function configuration switch module.

Preferably, the function display module visually may be configured by including at least one LED.

Preferably, the control module may control such that the unique identification information of the lighting apparatus stored in the storage module, and a access signal for accessing the external lighting control device or the server and a register signal for registering the lighting apparatus are transmitted through the communication module when a switching function selection signal having a bridge setting function is provided from the function configuration switch module.

Preferably, the control module may control such that the unique identification information of the lighting apparatus stored in the storage module and a register signal for registering the lighting apparatus are transmitted through the communication module when a switching function selection signal having a bridge releasing function is provided from the function configuration switch module.

Preferably, the external lighting control device may be configured with at least one of a wall controller, a remote controller, a sensor module, and a mobile communication terminal for lighting controlling.

Preferably, the sensor module may include at least one of a luminance sensor, a temperature sensor, a humidity sensor, a piezoelectric sensor, a gyro sensor, a pressure sensor, a proximity sensor, a microwave sensor, and a human body sensing sensor.

Preferably, the mobile communication terminal may be configured with at least one of a smartphone, a smart pad, and a smart note.

According to a second aspect of the present invention, there is provided a method of controlling a lighting apparatus including a function configuration switch module, wherein the method controls at least one lighting apparatus including a function configuration switch module and a control module, the method including: step a of outputting a switching function selection signal such that a bridge setting or releasing function for configuring a wireless mesh network is performed according to a switching operation state of a function configuration switch provided in the function configuration switch module; and step b of transmitting pre-stored unique identification information of the lighting apparatus, and a signal for bridge setting or releasing according to the switching function selection signal output in step a through the control module.

Herein, it is preferable that in step b, through the control module, the unique identification information of the lighting apparatus and the signal for bridge setting or releasing may be transmitted to the external lighting control device or the server by using a near field communication method of at least one of Bluetooth communication, ZigBee communication, Beacon communication, radio frequency identification (RFID) communication, ultra wideband (UWB) communication, and infrared data association (IrDA) communication, or by using a wireless communication method.

Preferably, in step b, the unique identification information of the lighting apparatus may include any one piece of information of an apparatus name, an apparatus password, an apparatus serial number, an apparatus type, an apparatus manufacturer, an apparatus media access control (MAC) address, an apparatus unique Internet protocol (IP) address, apparatus model and version, an apparatus secret key, and apparatus authentication information generated by a personal key based on a PKI.

Preferably, the method may further include: before step a, step of being provided with a signal for bridge accessing or register information data of the lighting apparatus which is transmitted from the external lighting control device or the sever for configuring a wireless mesh network through the control module, and storing the same in an additional storage module, wherein in step a, a switching function selection signal may be output according to a switching operation state of the function configuration switch provided in the function configuration switch module such that a bridge resetting function is further performed, and in step b, a setting initialization may be performed by removing the signal for bridge accessing or the register information data of the lighting apparatus which is stored in the storage module according to the switching function selection signal having the bridge resetting function output from the function configuration switch module.

Preferably, in step a, the switching operation state of the function configuration switch provided in the function configuration switch module may be determined by using at least one condition of a preset number of ON/OFF times and an ON time of a switch operation.

Preferably, the function configuration switch provided in the function configuration switch module may use at least one of a toggle switch, a pull switch, a slide switch, a push switch, a micro switch, a dip switch, and a rotary switch.

Preferably, when a function display module visually displaying a current function state to a user according to the switching function selection signal output from the function configuration switch module is provided, after step b, the method may further include: step of controlling an operation of the function display module so that the function display module displays a state by using at least one of a color of light, a brightness of light, and a number of blinks of light which is different for each function according to the switching function selection signal output from the function configuration switch module.

Preferably, the function display module may visually display the current function state to the user by using at least one LED.

Preferably, in step b, the unique identification information of the lighting apparatus stored in the storage module, and an access signal for accessing the external lighting control device or the server and a register signal for registering the lighting apparatus may be transmitted through the communication module when the switching function selection signal having the bridge setting function is provided from the function configuration switch module through the control module.

Preferably, in step b, the unique identification information of the lighting apparatus stored in the storage module, and a register signal for registering the lighting apparatus may be transmitted through the communication module when the switching function selection signal having the bridge releasing function is provided from the function configuration switch module through the control module.

According to a third aspect of the present invention, there is provided computer readable recording medium having a program, the program being capable of executing the above method of controlling the lighting apparatus including the function configuration switch module.

A method of controlling a lighting apparatus including a function configuration switch module according to the present invention may be implemented as a computer readable code on a computer readable recording medium. The computer-readable recording medium includes any recording device on which data readable by a computer system is recorded.

For example, the computer-readable recording medium includes a ROM, a RAM, a CD ROM, a magnetic tape, a hard disk, a floppy disk, a removable storage device, a nonvolatile memory (Flash Memory), an optical data storage device, etc.

Advantageous Effects

As described above, according to a lighting apparatus including a function configuration switch module and a control method therefor, and a computer readable recording medium having a program recorded thereon for the same, a bridge accessing delay time can be minimized and an accessing success rate can be maximized, thus lighting apparatuses can be efficiently controlled based on a wireless mesh network (WMN) by configuring each of the lighting apparatuses with a function configuration switch module in order to easily access and control a number of lighting apparatus configured based on the wireless mesh network (WMN).

BEST MODE

The objects, features and advantages of the invention will appear more fully upon consideration of the illustrative embodiments now to be described in detail with the accompanying drawings. Accordingly, the technological concepts of the present invention can be easily understood by one skilled in the art. In addition, the detailed description of known techniques relating to the present invention will be omitted so as not to obscure the gist of the invention.

While terms including ordinal numbers, such as "first", "second", etc., may be used to describe various components, such components are not limited by the above terms. The above terms are used only to distinguish one component from another. For example, a first component may be referred to as a second component without departing from the scope of the present invention, and likewise a second component may be referred to as a first component. The terms used in this application are used to merely describe the particular embodiments and are not intended to limit the present invention. Expressions of the singular numbers include the expressions of the plural numbers unless they are obviously differently expressed in the context.

While terms including ordinal numbers, such as "first", "second", etc., may be used to describe various components, such components are not limited by the above terms. The above terms are used only to distinguish one component from another. For example, a first component may be referred to as a second component without departing from the scope of the present invention, and likewise a second component may be referred to as a first component. The terms used in this application are used to merely describe the particular embodiments and are not intended to limit the present invention. Expressions of the singular numbers include the expressions of the plural numbers unless they are obviously differently expressed in the context.

The terms "include (or including)" or "comprise (or comprising)" are inclusive or open-ended and does not exclude additional, un-recited elements or method steps. "Unit", "module", "block", etc. used herein each represent a unit for handling at least one function or operation, and may be implemented in hardware, software, or a combination thereof.

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention. The embodiments of the present invention are provided to describe the present invention more clearly to those skilled in the art.

Combinations of blocks in the accompanying block diagrams or steps in the accompanying flowcharts can be executed by computer program instructions (execution engine), and the computer program instructions can be mounted in a processor of a general-use computer, special-use computer or other programmable data processing equipment. Thus, the instructions executed through the processor of the computer or other programmable data processing equipment generate units for performing functions described in the respective blocks of the block diagrams or the respective steps of the flowcharts. The computer program instructions can be stored in a computer usable or readable memory oriented to a computer or other programmable data processing equipment, in order to implement functions in a specific method. Thus, the instructions stored in the computer usable or readable memory can be used to manufacture products including instruction units for performing the functions described in the respective blocks of the block diagrams or the respective steps of the flowcharts.

As described above, the computer program instructions can be mounted in the computer or other programmable data processing equipment. Therefore, instructions which generate processes by performing a series of operation steps on the computer or other programmable data processing equipment and operate the computer or other programmable data processing equipment can provide steps for executing the functions described in the respective blocks of the block diagrams and the respective steps of the flowcharts.

Each of the blocks or steps may indicate a part of a module, segment or code including one or more executable instructions for executing specific logical functions. In some substitutions, the functions described in the blocks or steps can be performed out of sequence. That is, two blocks or steps can be operated or performed substantially at the same time, and the blocks or steps can be operated or performed in the reverse order of the corresponding function.

Figure 1:
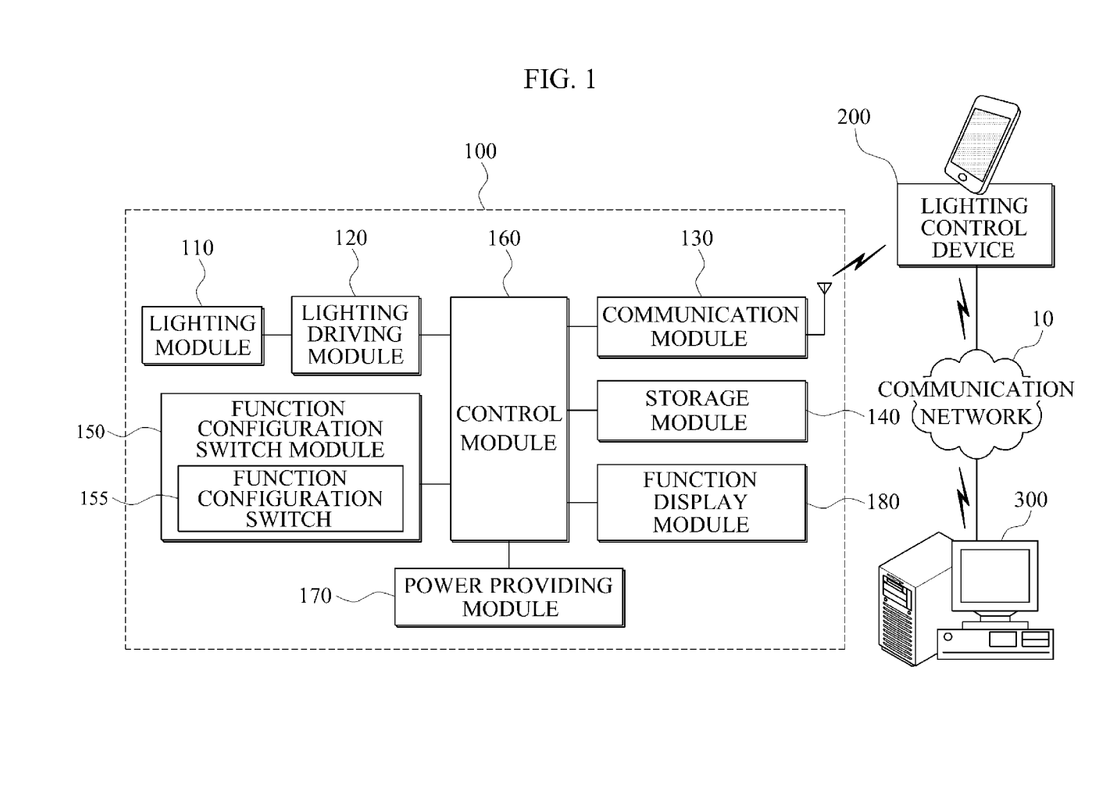
FIG. 1 is a view showing an entire block configuration diagram showing a lighting apparatus including a function configuration switch module according to an embodiment of the present invention.
Figure 2:
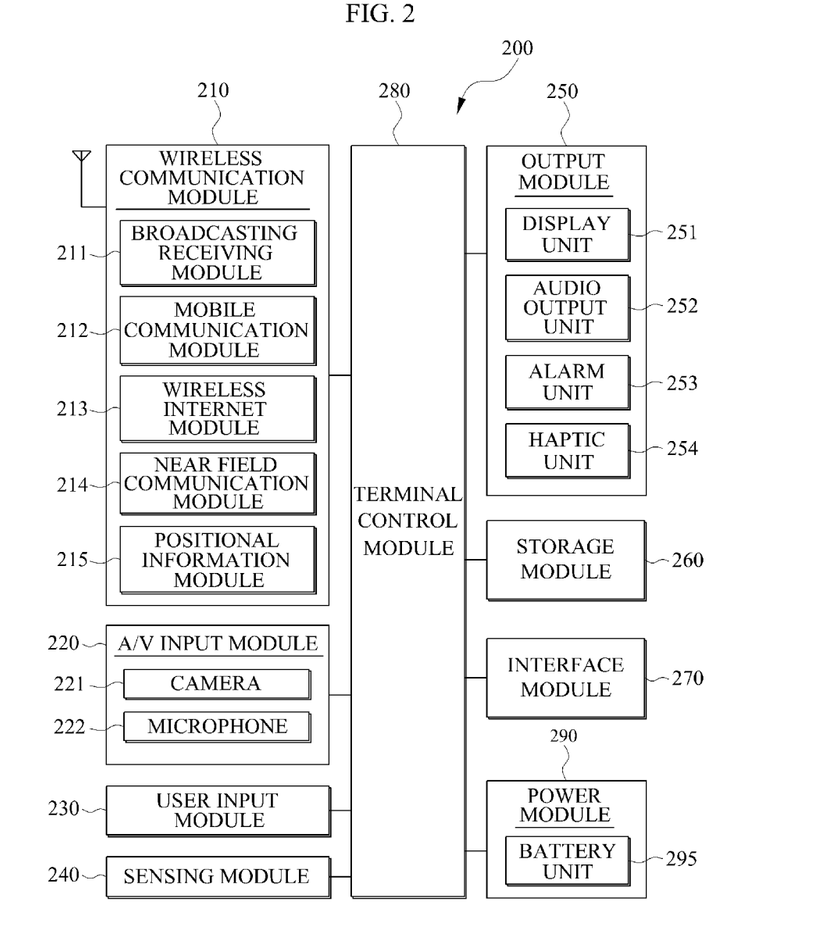
FIG. 2 is a view showing an entire block configuration diagram for illustrating a mobile communication terminal that is an embodiment of a lighting control device applied to an embodiment of the present invention.

FIG. 1 is a view showing an entire block configuration diagram showing a lighting apparatus including a function configuration switch module according to an embodiment of the present invention, and FIG. 2 is a view showing an entire block configuration diagram for illustrating a mobile communication terminal that is an embodiment of a lighting control device applied to an embodiment of the present invention.

Referring to FIGS. 1 and 2, a lighting apparatus including a function configuration switch module 100 according to an embodiment of the present invention is configured with a lighting module 110, a lighting driving module 120, a communication module 130, a storage module 140, a function configuration switch module 150, a control module 160, and a power providing module 170. In addition the lighting apparatus including a function configuration switch module 100 according to an embodiment of the present invention may further include a function display module 180. Meanwhile, configuration elements shown in FIG. 1 are not essential, and the lighting apparatus 100 may include more or fewer components.

Herein, the lighting module 110 is installed in a predetermined indoor space, and is a module emitting light by being driven by driving power applied from the lighting driving module 120. The lighting module 110 may be a module emitting various kinds of lights, but it is not limited to any one kind.

For example, the lighting module 110 may include at least one of a light emitting diode (LED) lamp that is a semiconductor element emitting light, a fluorescent lamp, an incandescent lamp, a halogen lamp, a neon tube lamp, a sodium lamp, a metalhalide lamp, and an electro-luminescent (EL) lamp, but it is not limited thereto.

The lighting driving module 120 is a module applying driving power to the lighting module 110 according to a control of the control module 160. The lighting driving module 120 applies driving power to the lighting module 110 by adjusting a brightness and a wavelength of light of the lighting module 110 according to a control command signal of the control module 160. The lighting driving module 120 may adjust a light amount by adjusting a current when the lighting module 110 is an LED, but it is not limited thereto.

The communication module 130 is a module that performs wired or wireless communication or both for the lighting apparatus 100. The communication module 130 may communicate with, in addition to neighbor other lighting apparatuses, a lighting control device 200 or a server 300 or both. The communication module 130 may include a wireless transmitter performing frequency-up conversion and amplification for a transmitting signal, and a wireless receiver performing low-noise amplification and frequency-down conversion for a received signal.

It is preferable for the above communication module 130 to use at least one of, for example, Bluetooth communication, ZigBee communication, Beacon communication, UWB (ultra wideband) communication, RFID (radio frequency identification) communication, and IrDA (infrared data association) communication according to a control of the control module 160. However, it is not limited thereto, for example, the communication module 130 may use a wireless communication method such as predetermined low power wireless communication, such as wireless personal area network (WPAN), wireless LAN (WLAN)(Wi-Fi), wireless broadband (Wibro), world interoperability for microwave access (Wimax), high speed downlink packet access (HSDPA), WiFi, etc.

The storage module 140 is a module that stores a program controlling an operation of the lighting module 110, data generated when performing the program, unique identification information of the corresponding lighting apparatus 100, etc., and may include a program memory and a data memory.

The program memory stores programs controlling general operations of the lighting apparatus 100. Herein, the program memory may store a program for connecting to the mesh network configured by the external lighting control device 200 or the sever 300 or both. In addition, the program memory may store a program for driving the lighting module 110 according to a control of the external lighting control device 200 or the sever 300 or both.

The data memory stores data generated while performing programs for the lighting apparatus 100. In the above data memory, for example, apparatus information, channel information, frequency information, and network group information, etc. may be stored.

In addition, in the data memory of the storage module 140, unique identification information of the lighting apparatus 100 may be stored. For example, it is preferable for the unique identification information of lighting apparatus 100 to include any one piece of information of a apparatus name, an apparatus passwords, an apparatus serial number, an apparatus type, an apparatus manufacture, an apparatus media access control (MAC) address, an apparatus unique Internet protocol (IP) address, apparatus model and version, an apparatus secret key, an apparatus authentication information generated by a personal key based on a PKI, but it is not limited thereto, all identification types of information identifying an apparatus may be included.

In other words, in the storage module 140, at least one program code executed by the control module 160, and at least one data set used by the program code may be stored and maintained.

The above storage module 140 may include, for example, at least one readable storage medium of a flash memory type, a hard disk type, a multimedia card micro type), a card type memory (for example, SD or XD memory, etc.), a random access memory (RAM), a static random access memory (SRAM), a read-only memory (ROM), an electrically erasable programmable read-only memory (EEPROM), a programmable read-only memory (PROM), a magnet memory, a magnet disc, and an optical disc.

The function configuration switch module 150 sets a bridge for configuring a wireless mesh network (WMN) according to a switching operation state of a function configuration switch 155 that is additionally provided, and outputs a switching function selection signal such that at least one of bridge releasing and bridge resetting is performed.

In addition, according to a switching operation state of the function configuration switch 155 provided in the function configuration switch module 150, in order to effectively register and control a plurality of other lighting apparatuses configured as the wireless mesh network (WMN) from the external lighting control device 200 or the sever 300 or both, the lighting apparatus 100 including a bridge setting function performs the role of data intermediating between the external lighting control device 200 or the sever 300 or both and other lighting apparatuses configured as the wireless mesh network (WMN).

Herein, it is preferable to determine a switching operation state of the function configuration switch 155 provided in function configuration switch module 150 by using, for example, at least one condition of a preset number of ON/OFF times and an ON time of a switch operation.

Meanwhile, for example, it is preferable for the function configuration switch 155 provided in the function configuration switch module 150 to be configured with at least one of a toggle switch, a pull switch, a slide switch, a push switch, a micro switch, a dip switch, and a rotary switch.

Meanwhile, the function configuration switch 155 provided in the function configuration switch module 150 may be installed in a proper position of the lighting module 110. For example, it is preferable to install on a mechanical surface except for a light emitting part and a base part of a bulb type lighting device, a mechanical surface except for a light emitting part and a base part of a tube type lighting device, the entire mechanical surface except for a light emitting part of a linear type lighting device, the entire shade part and mechanical surface except for a light emitting part of a lamp shade lighting device, the entire frame surface except for a light emitting part of a planar type (rectangle/circular) lighting device, and a cover inner mechanical surface or the entire side/rear surface of a lighting device in which a cover of a light emitting part is detachable.

The control module 160 is a module that controls overall operations of the lighting apparatus 100, performs various functions for the lighting apparatus 100, and executes various software programs or instruction groups or both which are integrated in the storage module 140 for data processing. In other words, the control module 160 may process various signals based on information stored in the storage module 140.

In addition, the control module 160 may receive various signals received from the communication module 130. In other words, the control module 160 may perform various calculations based on various signals received from the communication module 130.

In addition, the control module 160 may be connected to the wireless mesh network (WMN) configured with the external lighting control device 200 or the sever 300 or both. In addition, the control module 160 drives the lighting module 110 through the lighting driving module 120 according to a control of the external lighting control device 200 or the sever 300 or both.

In addition, the control module 160 controls operations of the lighting driving module 120 such that driving power is applied to the lighting module 110 according to a program stored in the storage module 140 by being provided with a lighting control signal output from the external lighting control device 200 or the sever 300 or both through the communication module 130, and based thereon.

In addition, the control module 160 controls such that unique identification information of the lighting apparatus 100 which is stored in the storage module 140, and a signal for bridge setting or bridge releasing are transmitted through the communication module 130 according to a switching function selection signal output from the function configuration switch module 150.

In addition, the control module 160 controls such that a signal for bridge accessing or register information data of at least one lighting apparatus 100 transmitted from the external lighting control device 200 or the sever 300 or both are received through the communication module 130 for configuring the wireless mesh network (WMN).

In addition, the control module 160 controls such that a setting initialization is performed by removing the signal for bridge accessing or register information data of the lighting apparatus 100 stored in the storage module 140 according to a switching function selection signal having a bridge reset function output from the function configuration switch module 150.

In addition, when the control module 160 is provided with a switching function selection signal having a bridge setting function from the function configuration switch module 150, the control module 160 controls such that unique identification information of the lighting apparatus 100 stored in the storage module 140, an access signal for accessing the external lighting control device 200 or the sever 300 or both, and a register signal for registering the lighting apparatus 100 are transmitted through communication module 130.

In addition, when the control module 160 is provided with a switching function selection signal having a bridge releasing function from the function configuration switch module 150, the control module 160 controls such that unique identification information of the lighting apparatus 100 stored in the storage module 140, and a register signal for registering the lighting apparatus 100 are transmitted through the communication module 130.

The power providing module 170 provides necessary power to the respective modules, in other words, the lighting module 110, the lighting driving module 120, the communication module 130, the storage module 140, the function configuration switch module 150, the control module 160, and the function display module 180. In order to provide continuous power, it is preferable for the power providing module 170 to be implemented to convert commercial AC power (for example, AC 220V) to DC power or AC power or both. However, it is not limited thereto, it may be implemented by using a conventional portable battery.

Additionally, the function display module 180 visually displaying a current function state to a user according to a switching function selection signal output from the function configuration switch module 150 may be further provided. It is preferable for the function display module 180 to be implemented by including at least one LED.

Herein, the control module 160 may control an operation of the function display module 180 so that function display module 180 displays a state by using at least one of a color, a brightness, and a number of blinks which is different for each functions according to a switching function selection signal output from the function configuration switch module 150.

Meanwhile, the external lighting control device 200 is installed in the predetermined indoor space, and is a device for manually or automatically controlling at least one lighting apparatus 100. For example, the external lighting control device 200 may be configured with at least one of a wall controller, a remote controller, a sensor module, and a mobile communication.

Herein, it is preferable for the sensor module to include at least one of, for example, a luminance sensor sensing surrounding brightness, a temperature sensor sensing surrounding temperature, a humidity sensor sensing surrounding humidity, a piezoelectric sensor, a gyro sensor, a pressure sensor, a proximity sensor sensing whether or not an object approaches, a microwave sensor, and a human body sensing sensor, and a proper sensor may be selected and applied according to an installation object such as lighting installation.

Herein, the temperature sensor is a sensor for sensing temperature in the air, and a thermistor element whose internal resistance value changes with an ambient temperature change may be used. The thermistor element may be an NTC thermistor, a PTC thermistor or a critical characteristic (CRT) thermistor.

It is preferable to configure the above temperature sensor with a contact type temperature sensor using the thermistor element. However, it is not limited thereto, and for example, it may be configured with a thermo couple sensor, a bimetal sensor, an IC temperature sensor, a IR sensor that is a non contact type sensor, etc.

The humidity sensor is a sensor for sensing humidity in the air, and generally senses the humidity by using changes in electrical properties of the humidity-sensitive material due to moisture.

The above humidity sensor is classified into a resistance type humidity sensor and a capacitance type humidity sensor, and is widely applied to, in addition to home appliances and mobile devices, autos, medical devices, air cleaning systems, automatic air conditioning and heating systems for optimization thereof.

The resistance type humidity sensor measures humidity by using changes in resistance that occurs by the humidity. The resistance type humidity sensor is widely used than the capacitance type humidity sensor since the resistance type has better price competitiveness.

However, recently, as the capacitive humidity sensor is manufactured in a one-chip form on a semiconductor substrate, the price competitiveness thereof has become superior to that of the resistance type humidity sensor. Accordingly, the use thereof is increasing. Particularly, the capacitance type humidity sensor is more reliable than the resistance type humidity sensor, and has a linear sensor characteristic and is affected little by temperature.

The above capacitance type humidity sensor is a sensor using a principle in which a capacitance changes according to a water molecular weight that is adsorbed on a humidity sensing film, and is operated in a capacitor form using as a dielectric material a humidity sensing material such as polyimide or ceramic in which dielectric constant thereof changes by absorbing moisture. In other words, when a humidity sensing film sensing humidity is present, a capacitance is changed according to changes in dielectric constant by moisture absorbed on the humidity sensing film.

The microwave sensor is a sensor using a Doppler radar principle. Particularly, the microwave sensor may be used in harsh environments having high heat, temperature, noise, moisture, air current, dust, etc., since a malfunction of the microwave sensor occurs at a low rate, a sensing distance thereof is large and a sensing angle (orientation angle) thereof is 120 degrees to 130 degrees. The microwave sensor may perform sensing by passing through glass, plaster board, etc. Accordingly, it is a proper sensor for controlling lighting devices according to the present invention.

The human body sensing sensor is a sensor for sensing a human body, and may be configured with, for example, at least one combination of a ultrasonic wave sensor, an IR sensor, a image sensor, a laser sensor, and a temperature sensor.

In addition, mobile communication terminal may be connected to the sever 300 remotely managing the lighting apparatus 100 through the communication network 10. In addition, the mobile communication terminal may be connected to at least one of the lighting apparatus 100 and a lighting control device 200 having a different form through the communication network 10 or a near field communication or both.

Herein, it is preferable to implement the communication network 10 by using an Ethernet or a mobile communication network, or the communication network 10 may be a communication network of a high speed backbone network of a large communication network being able to perform a large-scale service or may be an Internet or a next-generation wireless communication network including Wi-Fi, WiGig, wireless broadband Internet (Wibro), world interoperability for microwave access (Wimax) for providing a high-speed multimedia service.

The Internet refers to a worldwide open computer network structure providing transmission control protocol/internet protocol (TCP/IP) and various services of upper layers, such as hypertext transfer protocol (HTTP), telnet, file transfer protocol (FTP), domain name system (DNS), simple mail transfer protocol (SMTP), simple network management protocol (SNMP), network file service (NFS) and network information service (NIS), and provides an environment allowing the mobile communication terminal that is an embodiment of the to lighting control device 200 be connected to at least one of the lighting apparatus 100, a lighting control device 200 having a different form and the sever 300. Meanwhile, the Internet may be the wired or wireless Internet or a core network combined with a wired public network, a wireless mobile communication network, the mobile Internet, etc.

When the communication network 10 is a mobile communication network, it may be a synchronous or asynchronous mobile communication network. In an embodiment, the asynchronous mobile communication network may be a communication network of wideband code division multiple access (WCDMA). Herein, although it is not shown in the figure, the mobile communication network may include a radio network controller (RNC). Meanwhile, although a WCDMA network is described as an example, the mobile communication network may be a next generation network, such as a 3G LTE network, a 4G network or the like, or other IP networks based on IP. The communication network 10 performs a function of transferring signals and data between the mobile communication terminal and at least one of the lighting apparatus 100, the lighting control device 200 having a different form, and the server 300.

In addition, for example, the mobile communication terminal may perform a lighting control related application service by downloading a lighting control related application program that provides a lighting control management service from an app store or the light management server 300.

In addition, by using the lighting control related application service installed in the mobile communication terminal, at least one lighting apparatus selected from lighting apparatuses may be set as a bridge control means and remaining lighting apparatuses may be designated to a mesh network group.

In addition, by using the lighting control related application service installed in the mobile communication terminal, the lighting apparatus selected as the bridge control means and the lighting apparatuses designated as the mesh network group may be registered.

In addition, by using the lighting control related application service installed in the mobile communication terminal, operations of the lighting device registered as the bridge control means and the lighting devices designated as the mesh network group may be controlled by connecting to the lighting apparatus registered as the bridge control means and based thereon.

Meanwhile, it is preferable to configure the mobile communication terminal with a mobile terminal apparatus of at least one of a smartphone, a smart pad, and a smart note which communicates through wireless Internet or mobile Internet. In addition, the mobile communication terminal may mean overall wired wireless home/communication apparatuses such as palm PC, mobile play-station, and digital multimedia broadcasting (DMB) phone, tablet PC, or iPad which include communication functions and which include an interface for connecting to at least one of the lighting apparatus 100, the lighting control device 200 having a different form, and the server 300.

Figure 3:
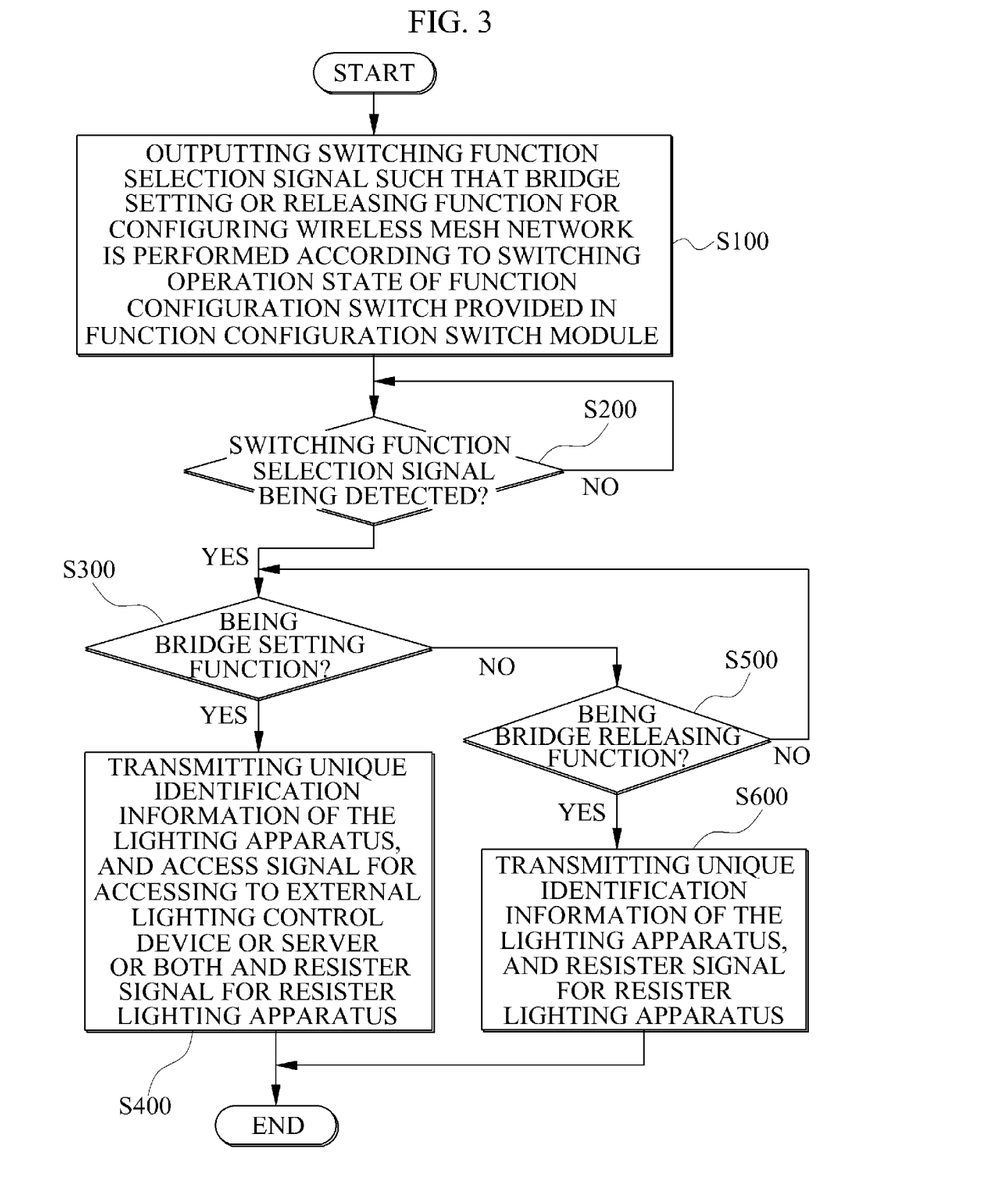
FIG. 3 is a view showing the entire flowchart for illustrating a control method of the lighting apparatus including the function configuration switch module according to an embodiment of the present invention.

The above mobile communication terminal, as shown in FIG. 2, may include a wireless communication module 210, an A/V (audio/video) input module 220, a user input module 230, a sensing module 240, an output module 250, a storage module 260, an interface module 270, a terminal control module 280, and a power module 290. Meanwhile, configuration elements shown in FIG. 3 are not essential, and the mobile communication terminal may include more or fewer configuration elements.

Hereinafter, configuration elements of the mobile communication terminal 100 will be described in detail.

The wireless communication module 210 may include at least one module that enables wireless communication between the mobile communication terminal 200 and a wireless communication system (for example, respective lighting devices 100-1 to 100-N, lighting control device 300, light management server 400, other management server, etc.). For example, the wireless communication module 210 may include a broadcast receiving module 211, a mobile communication module 212, a wireless internet module 213, a near field communication module 214, and a positional information module 215.

The broadcasting receiving module 211 receives a broadcast signal (for example, TV broadcasting signal, radio broadcasting signal, data broadcasting signal, etc.) or broadcast associated information or both from an external broadcast management server via various broadcasting channels (for example, satellite channel, terrestrial channel, etc.).

The mobile communication module 212 transmits and receives radio signals to and from at least one of a base station, an external terminal or a server over a mobile communication network. The radio signals may include voice call signals, video telephony call signals or data in various forms according to the transmission and reception of text or multimedia messages or both.

The wireless Internet module 213 refers to a module for wireless Internet access. The wireless Internet module 113 may be internally or externally coupled to the mobile communication terminal 200. As technologies for wireless Internet, for example, WLAN (wireless LAN), Wi-Fi, Wibro, Wimax, high speed downlink packet access (HSDPA), and long term evolution (LTE) may be used.

The near field communication module 214 is a module for near field communication. As technologies for near field communication, Bluetooth communication, ZigBee communication, UWB (ultra wideband) communication, RFID (Radio Frequency identification) communication, and IrDA (infrared data association) communication may be used.

The positional information module 215 is a module for checking and obtaining a position of the mobile communication terminal 200, and current position information of the mobile communication terminal 200 may be obtained by using a GPS (global position system), etc.

The A/V (audio/video) input module 220 is a module for receiving an audio or video signal, and includes a camera 221 and a microphone 222. The camera 221 processes image frames of still pictures or video obtained by an image sensor in a photographing mode or a video telephony mode. The microphone 222 receives an external audio signal through a microphone during a phone call mode, a recording mode, a voice recognition mode, etc, and processes the receives signal to electrical voice data The user input module 230 is a module that generates input data for a user to control operation of the mobile communication terminal 200. The user input module 230 may be configured to include, for example, a keypad, a dome switch, a touchpad (static pressure or static capacitance), a jog wheel, a jog switch, etc.

The sensing module 240 detects a current status of the mobile communication terminal 200 such as an open/closed state of the mobile communication terminal 200, a position of the mobile communication terminal 200, presence of a user's contact, a touch operation of the user with respect to a particular part, orientation of the mobile communication terminal 200, and acceleration or deceleration of the mobile communication terminal 200, etc., and generates a sensing signal for controlling operation of the mobile communication terminal 200. The sensing signal is transmitted to terminal control module 280 and used by the terminal control module 280 to perform a particular function.

The output module 250 is a module for generating output related to visual, auditory, and tactile sense, and may include a display unit 251, an audio output unit 252, an alarm unit 253, and a haptic unit 254.

The display unit 251 displays information processed by the mobile communication terminal 200. For example, when the mobile communication terminal 200 is in a call mode, the display unit 251 may display a user interface (UI) or a graphic user interface (GUI) associated with the call. When the mobile communication terminal 200 is in a video communication mode or a photograph mode, the display unit 251 may display at least one of captured and received pictures, a UI, and a GUI.

The audio output unit 252 may output, for example, audio data received from the wireless communication module 210 or stored in the storage module 260 during a call-receiving mode, a communication mode, a recording mode, a voice recognition mode, or a broadcasting receiving mode.

The alarm unit 253 may output a signal for notifying occurrence of a particular event associated with the mobile communication terminal 200. Events occurring in the mobile communication terminal 200 may be a call signal reception, a message reception, a key signal input, a touch input, etc.

The haptic unit 254 generates various tactile effects that may be sensed by the user. Vibration is a representative tactile effect generated by the haptic unit 254. Strength and pattern of a vibration generated in the haptic unit 254 may be controlled.

The storage module 260 may store programs for operation of the terminal control module 280, and temporarily store input/output data (for example, a phonebook, a message, a still picture, a moving picture, etc). The storage module 260 may store data about vibration and sound of various patterns output when the user touches the touch screen.

The storage module 260 may include at least one type of storage media from among a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

The interface module 270 performs the role of a passage to all kinds of external devices connected to the mobile communication terminal 200. The interface unit 270 receives data or power from an external device and delivers the received data or power to individual elements within the mobile communication terminal 200, or transmits data from the mobile communication terminal 200 to an external device.

The terminal control module 280 generally controls the overall operation of the mobile communication terminal 100. For example, the terminal control module 280 performs control and processing related to voice calls, data communication, video calls, etc.

In addition, the terminal control module 280 may continuously monitor a charging current and a charging voltage of a battery unit 295, and temporarily store the monitored value in the storage module 260. Herein, it is preferable for the storage module 260 to store, in addition to battery charging status information such as monitored charging current and charging voltage, battery capacity information (production code, rating, etc.).

The power module 290 receives internal and external power by the control of the terminal control module 280, and provides power required for operating various components for the mobile communication terminal 200. The power module 290 operates to provide power of the battery unit 295 integrated therein to respective configuration elements, and the battery unit may be charged through a charging terminal (not shown).

Various embodiments of the present invention described in this document may be implemented within a recording medium that can be read by a computer or a device similar thereto by using software, hardware, or a combination thereof As for hardware implementation, embodiments of the present invention can be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units for performing functions. In some cases, the embodiments may be implemented by the terminal control module 280.

In the case of software implementation, embodiments of the present invention related to a procedure or a function can be implemented with a separate software module which enables at least one function or operation to be carried out. Software codes may be implemented by a software application written in a suitable programming language. Also, the software codes can be stored in the storage module 260 and executed by the terminal control module 280.

Meanwhile, when the mobile communication terminal 200 is configured with a smart phone it will be understood that the smartphone is an open-operating-system-based phone in which a user may freely download, use, and delete a variety of desired application programs, unlike a general cell phone (namely, a feature phone), and may be a communication device including a mobile phone having a mobile office function in addition to functions such as voice/video calls, Internet data communication, etc. or any Internet phone or tablet PC which can access the Internet but does not have a voice call function.

The above smartphone may be implemented as a smartphone with an open operating system. Examples of the open operating system include Nokia's Symbian, RIM's BlackBerry, Apple's iOS, Microsoft's Windows Mobile, Google's Android, and Samsung's Bada.

Accordingly, since the smartphone use an open operating system unlike a cellular phone having a closed operating system, a user may install and manage various application programs.

In other words, the above-described smartphone basically includes a control unit, a memory unit, a screen output unit, a key input unit, a sound output unit, a camera unit, a wireless network communication module, a near field wireless communication module, and a battery for supplying power.

The control unit is a functional element for controlling an operation of the smartphone, and includes at least one process and an execution memory, which are connected with each functional element included in the smartphone through a BUS.

The above control unit controls an operation of the smartphone by loading at least one program code included in the smartphone to the execution memory through the processor, performing calculation, and delivering a result of the calculation to at least one functional element through the BUS.

The memory unit is a non-volatile memory included in the smartphone, and stores at least one program code that is executed through the control unit and at least one data set that is used by the program code. Basically, the memory unit stores a system program code and a system data set that correspond to an operating system of the smartphone, a communication program code and a communication data set that process a wireless communication connection of the smartphone, and at least one application program code and application data set. The program code and the data set that are used to implement the present invention are also stored in the memory unit.

The screen output unit includes a screen output device (for example, a liquid crystal display (LCD) device) and an output module for driving the screen output device and is connected with the control unit through the bus to output a calculation result corresponding to a screen output among various calculation results of the control unit to the screen output device.

The key input unit includes a key input device (or a touch screen device that interoperates with the screen output unit) having at least one key button and an input module for driving the key input device and is connected with the control unit through the bus to input commands for instructing various calculations of the control unit or data that is needed for the operations of the control unit.

The sound output unit includes a speaker for outputting a sound signal and a sound module for driving the speaker, and is connected with the control unit through the bus to output a calculation result corresponding to a sound output among various calculation results of the control unit through the speaker. The sound module decodes sound data to be output through the speaker, and converts the decoded sound data into a sound signal.

The sound input unit includes a microphone for receiving a sound signal and a sound module for driving the microphone and delivers sound data that is received through the microphone to the control unit. The sound module encodes a sound signal that is received through the microphone.

The camera unit includes an optical unit, a charge coupled device (CCD), and a camera module for driving the CCD, and acquires bitmap data that is input to the CCD through the optical unit. The bitmap data may include both of still image data and moving image data.

The wireless network communication module is a communication element for enabling wireless communication, includes at least one of an antenna, an RF module, a baseband module, and a signal processing module, and is connected with the control unit through the bus to transmit a calculation result corresponding to the wireless communication among the various calculation results of the control unit, or maintain access, registration, communication, and handoff procedures of the wireless communication while receiving data through the wireless communication to transmit the received data to the control unit.

In addition, the wireless network communication module includes a mobile communication element that performs at least one of access to a mobile communication network, position registration, call processing, call connection, data communication, and a handoff according to code division multiple access (CDMA)/wideband code division multiple access (WCDMA) standards. It will be understood by a person skilled in the art that the wireless network communication module may further include a mobile Internet communication element for performing at least one of the access to mobile Internet, the position registration, the data communication, and the handoff according to IEEE 802.16 standards. However, it is apparent that the present invention is not limited to wireless communication elements that are provided by the wireless network.

The near field wireless communication module is configured to establish a communication session using a radio frequency signal within a certain distance as a communication medium, and may include at least one of a RFID communication, Bluetooth communication, wireless fidelity (Wi-Fi) communication, and public radio communication in ISO 180000 series standards. In addition, the near field wireless communication module may be integrated with the wireless network communication module.

FIG. 3 is a view showing the entire flowchart for illustrating a control method of the lighting apparatus including the function configuration switch module according to an embodiment of the present invention, otherwise described, the method is performed by the control module 160.

Referring to FIGS. 1 to 3, in a control method of a lighting apparatus including a function configuration switch module according to an embodiment of the present invention, first, in step S100, a switching function selection signal is output so that a bridge setting or bridge releasing function is performed for configuring a wireless mesh network (WMN) according to a switching operation state of the function configuration switch 155 provided in the function configuration switch module 150.

Then, in step S200, whether or not the switching function selection signal output from the function configuration switch module 150 is detected is determined by monitoring in real time a signal output from the function configuration switch module 150 through the control module 160 of the lighting apparatus 100.

When, it is determined that the switching function selection signal output from the function configuration switch module 150 is detected in step S200, in steps S300 to S600, pre-stored unique identification information of the lighting apparatus 100, and a signal for bridge setting or releasing are transmitted through the control module 160 according to the switching function selection signal output in step S100.

In other words, when a switching function selection signal having a bride setting function is provided from the function configuration switch module 150 through the control module 160, in steps S300 and S400, the pre-stored unique identification information of the lighting apparatus 100, and an access signal for accessing to the external lighting control device 200 or the sever 300 or both and a register signal for registering the lighting apparatus 100 may be transmitted.

In addition, a switching function selection signal having a bride releasing function is provided from the function configuration switch module 150 through the control module 160, in steps S500 and S600, the pre-stored unique identification information of the lighting apparatus 100, and a register signal for registering the lighting apparatus 100 may be transmitted.

Meanwhile, it is preferable to transmit, through the control module 160, to the external lighting control device 200 or the sever or both 300 the unique identification information of the corresponding lighting apparatus 100 and a signal for bridge setting or releasing by using near field communication such as, for example, at least one of Bluetooth communication, ZigBee communication, Beacon communication, radio frequency identification (RFID) communication, ultra wideband (UWB) communication, and infrared data association (IrDA) communication, or a wireless communication method.

Herein, it is preferable for the unique identification information of the lighting apparatus to include any one piece of information of an apparatus name, an apparatus passwords, an apparatus serial number, a apparatus type, an apparatus manufacturer, an apparatus media access control (MAC) address, an apparatus unique Internet protocol (IP) address, apparatus model and version, an apparatus secret key, apparatus authentication information generated by a personal key based on a PKI, but it is not limited thereto, and all identification types of information identifying an apparatus may be included.

Additionally, before the step S100, step of being provided with a bridge access and register information data of at least one lighting apparatus 100 for configuring the wireless mesh network (WMN) from the external lighting control device 200 or the sever 300 or both through the control module 160, and storing the same in the storage module 140 may be further included.

In addition, in step S100, a switching function selection signal may be output so that a bridge resetting function is further performed according to a switching operation state of the function configuration switch 155 provided in the function configuration switch module 150.

Herein, according to a switching function selection signal having a bridge resetting function and which is output from the function configuration switch module 150 through the control module 160, a setting initialization may be performed by removing a signal for bridge accessing or register information data of at least one lighting apparatus 100 which is storied in the storage module 140.

Meanwhile, in step S100, the switching operation state of the function configuration switch 155 provided in the function configuration switch module 150 may be determined, for example, by using at least one condition of a number of preset ON/OFF times and an ON time of a switch operation.

In addition, the function configuration switch 155 provided in the function configuration switch module 150 may use, for example, at least one of a toggle switch, a pull switch, a slide switch, a push switch, a micro switch, a dip switch, and a rotary switch.

In addition, when the function display module 180 that visually displays a current function state to the user according to a switching function selection signal output from the function configuration switch module 150 is provided, after step S100, S400, or S600, according to the switching function selection signal output in step S100 through the control module 160, step of controlling an operation of the function display module 180 so that the function display module 180 displays a state by using at least one of a color, a brightness, and a number of blinks which is different for each function. Herein, it is preferable for the function display module 180 to visually display a current state to the user by using at least one LED.

For example, when the function configuration switch 155 provided in the function configuration switch module 150 is implemented by using a toggle switch, the function display module 180 may be operated to perform a single blink in a red color LED when the toggle switch is switched ON shortly once for a bridge setting function.

In addition, for a bridge setting function, when the toggle switch is switched ON shortly two times, the function display module 180 may be operated to perform two blinks in a green color LED.

In addition, for a bridge resetting function, when the toggle switch is pushed for a predetermined long time, the function display module 180 may be operated to perform three blinks in an orange color LED.

Meanwhile, the method of controlling the lighting apparatus including the function configuration switch module according to an embodiment of the present invention may be implemented as a program code recorded in a computer-readable recording medium. The computer-readable recording medium may include all types of storage devices on which computer-readable data can be stored.

For example, the computer-readable recording medium may be read-only memory (ROM), random access memory (RAM), compact disc ROM (CD-ROM), magnetic tape, a floppy disc, an optical data storage device, etc. Also, a carrier wave (i.e., transmission through Internet) may be included as the computer-readable recording medium.

Also, the computer-readable recording medium may be distributed over computer systems connected through wire or wireless communication networks, and the computer-readable program code can be stored and executed in the distributive manner.

A preferred embodiment of the above described lighting apparatus including a function configuration switch module and a control method therefor, and a computer readable recording medium having a program recorded thereon for the same have been described, but the present invention is not limited thereto. It will be understood by those skilled in the art that various changes in form and details may be made therein without departing from the spirit and scope of the invention as defined by the appended claims.

INDUSTRIAL APPLICABILITY

The present invention may be widely used in the field of a lighting apparatus based on a wireless mesh network.

The invention claimed is:

1. A lighting apparatus including a function configuration switch module, the apparatus comprising:
a lighting module installed in a predetermined indoor space and emitting light;
a lighting driving module applying driving power to the lighting module;
a communication module performing data communication with an external lighting control device or a sever;
a storage module storing a program that controls an operation of the lighting module, data generated by executing the program, and unique identification information of the lighting apparatus;
a function configuration switch module for configuring access to a wireless mesh network via a function configuration switch; and
a control module controlling an operation of the lighting driving module such that the driving power is applied to the lighting module according to the program stored in the storage module by being provided with a lighting control signal output from the external lighting control device or the server through the communication module, and controls such that the unique identification information of the lighting apparatus stored in the storage module, and a signal for bridge setting or releasing are transmitted through the communication module according to the switching function selection signal output from the function configuration switch module.

2. The apparatus of claim 1, wherein the lighting module includes at least one of a light emitting diode (LED) lamp that is a semiconductor element emitting light, a fluorescent lamp, an incandescent lamp, a halogen lamp, a neon tube lamp, a sodium lamp, a metalhalide lamp, and a electroluminescent (EL) lamp.

3. The apparatus of claim 1, wherein the lighting driving module applies the driving power to the lighting module by adjusting a brightness and a wavelength of light according to a control of the control module.

4. The apparatus of claim 1, wherein the communication module performs data communication with the external lighting control device or the server by using a near fled communication method of at least one of Bluetooth communication, ZigBee communication, Beacon communication, radio frequency identification (RFID) communication, ultra wideband (UWB) communication, and infrared data association (IrDA) communication, or by using a wireless communication method according to a control of the control module.

5. The apparatus of claim 1, wherein the unique identification information of the lighting apparatus stored in the storage module includes any one piece of information of an apparatus name, an apparatus password, an apparatus serial number, an apparatus type, an apparatus manufacturer, an apparatus media access control (MAC) address, an apparatus unique Internet protocol (IP) address, apparatus model and version, an apparatus secret key, and apparatus authentication information generated by a personal key based on a PKI.

6. The apparatus of claim 1, wherein the function configuration switch module outputs a switching function selection signal according to the switching operation state of the function configuration switch module so that a bridge resetting function is further performed, and the control module controls such that a signal for bridge accessing or register information data of the lighting apparatus which is transmitted from the external lighting control device or the server for configuring the wireless mesh network is provided through the communication module and stored in the storage module, and controls such that a setting initialization is performed by removing the signal for bridge accessing or the register information data of the lighting apparatus which is stored in the storage module according to the switching function selection signal having the bridge resetting function which is output from the function configuration switch module.

7. The apparatus of claim 1, wherein the switching operation state of the function configuration switch provided in the function configuration switch module is determined by using at least one condition of a preset number of ON/OFF times and an ON time of a switch operation.

8. The apparatus of claim 1, wherein the function configuration switch provided in the function configuration switch module is configured with at least one of a toggle switch, a pull switch, a slide switch, a push switch, a micro switch, a dip switch, and a rotary switch.

9. The apparatus of claim 1, further comprising a function display module visually displaying a current function state to a user according to the switching function selection signal output from the function configuration switch module, wherein the control module controls an operation of the function display module 180 so that the function display module 180 displays a state by using at least one of a color of light, a brightness of light, and a number of blinks of light which is different for each function according to the switching function selection signal output from the function configuration switch module.

10. The apparatus of claim 9, wherein the function display module visually is configured by including at least one LED.

11. The apparatus of claim 1, wherein the control module controls such that the unique identification information of the lighting apparatus stored in the storage module, and a access signal for accessing the external lighting control device or the server and a register signal for registering the lighting apparatus are transmitted through the communication module when a switching function selection signal having a bridge setting function is provided from the function configuration switch module.

12. The apparatus of claim 1, wherein the control module controls such that the unique identification information of the lighting apparatus stored in the storage module and a register signal for registering the lighting apparatus are transmitted through the communication module when a switching function selection signal having a bridge releasing function is provided from the function configuration switch module.

13. The apparatus of claim 1, wherein the external lighting control device is configured with at least one of a wall controller, a remote controller, a sensor module, and a mobile communication terminal for lighting controlling.

14. The apparatus of claim 13, wherein the sensor module includes at least one of a luminance sensor, a temperature sensor, a humidity sensor, a piezoelectric sensor, a gyro sensor, a pressure sensor, a proximity sensor, a microwave sensor, and a human body sensing sensor.

15. The apparatus of claim 13, wherein the mobile communication terminal is configured with at least one of a smartphone, a smart pad, and a smart note.

16. A method of controlling a lighting apparatus including a function configuration switch module and a control module, the method comprising:

step (a) of outputting a switching function selection signal for configuring access to a wireless mesh network via a function configuration switch provided in the function configuration switch module; and step (b) of transmitting pre-stored unique identification information of the lighting apparatus, and a signal for bridge setting or releasing according to the switching function selection signal output in step (a) through the control module, wherein before step (a), a signal is provided for bridge accessing or register information data of the lighting apparatus which is transmitted from the external lighting control device or the sever for configuring a wireless mesh network through the control module, and storing the same in an additional storage module, in step (a), a switching function selection signal is output according to a switching operation state of the function configuration switch provided in the function configuration switch module such that a bridge resetting function is further performed, and in step (b), a setting initialization is performed by removing the signal for bridge accessing or the register information data of the lighting apparatus which is stored in the storage module according to the switching function selection signal having the bridge resetting function output from the function configuration switch module.

17. The method of claim 16, wherein in step (b), through the control module, the unique identification information of the lighting apparatus and the signal for bridge setting or releasing are transmitted to the external lighting control device or the server by using a near field communication method of at least one of Bluetooth communication, ZigBee communication, Beacon communication, radio frequency identification (RFID) communication, ultra wideband (UWB) communication, and infrared data association (IrDA) communication, or by using a wireless communication method.

18. The method of claim 16, wherein in step (b), the unique identification information of the lighting apparatus includes any one piece of information of an apparatus name, an apparatus password, an apparatus serial number, an apparatus type, an apparatus manufacturer, an apparatus media access control (MAC) address, an apparatus unique Internet protocol (IP) address, apparatus model and version, an apparatus secret key, and apparatus authentication information generated by a personal key based on a PKI.

19. The method of claim 16, wherein in step (a), the switching operation state of the function configuration switch provided in the function configuration switch module is determined by using at least one condition of a preset number of ON/OFF times and an ON time of a switch operation.

20. The method of claim 16, wherein the function configuration switch provided in the function configuration switch module uses at least one of a toggle switch, a pull switch, a slide switch, a push switch, a micro switch, a dip switch, and a rotary switch.

21. The method of claim 16, wherein when a function display module visually displaying a current function state to a user according to the switching function selection signal output from the function configuration switch module is provided, after step (b), the method further comprising: step of controlling an operation of the function display module so that the function display module displays a state by using at least one of a color of light, a brightness of light, and a number of blinks of light which is different for each function according to the switching function selection signal output from the function configuration switch module.

22. The method of claim 21, wherein the function display module visually displays the current function state to the user by using at least one LED.

23. The method of claim 16, wherein in step (b), the unique identification information of the lighting apparatus stored in the storage module, and an access signal for accessing the external lighting control device or the server and a register signal for registering the lighting apparatus are transmitted through the communication module when the switching function selection signal having the bridge setting function is provided from the function configuration switch module through the control module.

24. The method of claim 16, wherein in step (b), the unique identification information of the lighting apparatus stored in the storage module, and a register signal for registering the lighting apparatus are transmitted through the communication module when the switching function selection signal having the bridge releasing function is provided from the function configuration switch module through the control module.

* * * * *

UNITED STATES PATENT AND TRADEMARK OFFICE
CERTIFICATE OF CORRECTION

| | |
|---|---|
| PATENT NO. | : 10,485,055 B2 |
| APPLICATION NO. | : 15/754217 |
| DATED | : November 19, 2019 |
| INVENTOR(S) | : Choong-Yong Sohn |

Page 1 of 1

It is certified that error appears in the above-identified patent and that said Letters Patent is hereby corrected as shown below:

On the Title Page

"(30) Foreign Application Priority Data
Mar. 16, 2016, (KR) .....................10-2016-0028709"
Should read:
-- (30) Foreign Application Priority Data
Mar. 10, 2016 (KR) .....................10-2016-0028709 --

Signed and Sealed this
Twelfth Day of May, 2020

Andrei Iancu
*Director of the United States Patent and Trademark Office*